United States Patent
Nakayama et al.

(10) Patent No.: US 10,690,191 B2
(45) Date of Patent: Jun. 23, 2020

(54) ELASTIC SHAFT COUPLING

(71) Applicant: SMC CORPORATION, Chiyoda-ku (JP)

(72) Inventors: Toru Nakayama, Soka (JP); Ryuichi Masui, Bando (JP); Yutaka Yoshida, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 255 days.

(21) Appl. No.: 15/695,761

(22) Filed: Sep. 5, 2017

(65) Prior Publication Data

US 2018/0066712 A1 Mar. 8, 2018

(30) Foreign Application Priority Data

Sep. 5, 2016 (JP) ................... 2016-172585

(51) Int. Cl.
*F16D 3/08* (2006.01)
*F16D 1/08* (2006.01)
*F16D 3/68* (2006.01)
*F16D 3/74* (2006.01)

(52) U.S. Cl.
CPC ............. *F16D 3/08* (2013.01); *F16D 1/0847* (2013.01); *F16D 1/0864* (2013.01); *F16D 1/0876* (2013.01); *F16D 3/68* (2013.01); *F16D 3/74* (2013.01)

(58) Field of Classification Search
CPC ........ F16D 3/08; F16D 1/0876; F16D 1/0847; F16D 1/0864; F16D 3/74; F16D 3/68
USPC ..................................................... 464/76, 85
See application file for complete search history.

(56) References Cited

U.S. PATENT DOCUMENTS

| | | | |
|---|---|---|---|
| 1,607,362 A * | 11/1926 | Powers ...................... | F16D 3/56 464/85 |
| 1,802,342 A * | 4/1931 | Froussard ................. | F16D 3/48 464/85 |
| 3,837,179 A | 9/1974 | Barth | |
| 8,920,248 B2 | 12/2014 | Memel et al. | |

(Continued)

FOREIGN PATENT DOCUMENTS

| | | |
|---|---|---|
| JP | 48-103941 A | 12/1973 |
| JP | 63-166723 U | 10/1988 |

(Continued)

OTHER PUBLICATIONS

Office Action dated Feb. 26, 2019 in corresponding Japanese Patent Application No. 2016-172585 (with English Translation), 10 pages.

*Primary Examiner* — Greg Binda
(74) *Attorney, Agent, or Firm* — Oblon, McClelland, Maier & Neustadt, L.L.P.

(57) ABSTRACT

An elastic body of an elastic shaft coupling includes a connection portion disposed around a center axis of the elastic shaft coupling, and a plurality of rotation transmission portion of substantially columnar shapes provided for the connection portion along the circumferential direction of the elastic shaft coupling, and extending from the connection portion along the center axis. Outer circumferential portions of the rotation transmission portions are in surface contact with a first hub main body portion and first protrusion portions of a first hub, and a second hub main body portion and second protrusion portions of a second hub.

5 Claims, 11 Drawing Sheets

(56) References Cited

U.S. PATENT DOCUMENTS 10,087,993 B2 * 10/2018 Kleinewegen ............ F16D 3/68
2014/0116608 A1    5/2014 Sato et al.

FOREIGN PATENT DOCUMENTS

| JP | 6-87729 U | 12/1994 | | |
|---|---|---|---|---|
| JP | 10-96429 | 4/1998 | | |
| JP | 3063860 U | 11/1999 | | |
| JP | 3065820 U | 2/2000 | | |
| JP | 3066703 U | 3/2000 | | |
| JP | 2002-242950 A | 8/2002 | | |
| JP | 2005-83443 | 3/2005 | | |
| JP | 2006-342886 | 12/2006 | | |
| JP | 2008-208952 | 9/2008 | | |
| JP | 2012-167743 | 9/2012 | | |
| JP | 2013-57372 | 3/2013 | | |
| JP | 2014-92168 | 5/2014 | | |
| NL | 56753 | * | 8/1944 | ...................... 464/85 |

* cited by examiner

ELASTIC SHAFT COUPLING

CROSS-REFERENCE TO RELATED APPLICATION

This application is based upon and claims the benefit of priority from Japanese Patent Application No. 2016-172585 filed on Sep. 5, 2016, the contents of which are incorporated herein by reference.

BACKGROUND OF THE INVENTION

Field of the Invention

The present invention relates to an elastic shaft coupling that includes a pair of metal hubs formed in a substantially same shape and assembled to each other in a state where phases thereof are shifted at a predetermined angle in a circumferential direction, and an elastic body interposed between the pair of hubs.

Description of the Related Art

Conventionally, elastic shaft couplings each including an elastic body (spider) made of rubber or resin are used for connection parts of two rotation shafts (see, for example, Japanese Laid-Open Patent Publication No. 2014-092168, Japanese Laid-Open Patent Publication No. 2006-342886 and Japanese Laid-Open Patent Publication No. 2005-083443). The elastic shaft coupling includes a pair of metal hubs that are formed in the substantially same shape and connected to rotation shafts, and an elastic body interposed between the hubs. Consequently, even when an eccentricity or an eccentric angle is produced between the two rotation shafts, elastic deformation of the elastic body allows the eccentricity or the eccentric angle.

SUMMARY OF THE INVENTION

A pair of hubs each include a hub main body portion of a disk shape with which a rotation shaft is connected, and a claw portion formed to protrude from each hub main body portion along a center axis of the elastic shaft coupling or a cutout formed in each hub main body portion. Meanwhile, the elastic body includes a connection portion of a disk shape, and a claw portion is formed protruding from the connection portion along the center axis or a cutout is formed in the connection portion. Hence, when the elastic shaft coupling is assembled by fitting the claw portion between the claw portions of the pair of hubs, or fitting the claw portions of the pair of hubs to the cutouts of the elastic body, or fitting the claw portions of the elastic body to the cutouts of the pair of hubs, the entire length in a direction along the center axis of the elastic shaft coupling undesirably becomes long by the length corresponding to the connection portion.

Further, the shape of each hub is complicated. Therefore, it is necessary to manufacture each hub by cold forging, hot forging, die-cast or cut-machining, resulting in a high manufacturing cost.

The present invention has been made to solve the above problem, and an object of the present invention to provide an elastic shaft coupling which makes it possible to reduce the entire length and reduce a manufacturing cost.

An elastic shaft coupling according to the present invention relates to an elastic shaft coupling including: a pair of metal hubs formed in a substantially same shape and assembled to each other in a state where phases are shifted at a predetermined angle in a circumferential direction; and an elastic body interposed between the pair of hubs.

To achieve the above object, in the elastic shaft coupling according to the present invention, the elastic body includes a connection portion disposed around a center axis of the elastic shaft coupling, and a plurality of rotation transmission portions provided for the connection portion along the circumferential direction, and each extending in a substantially bar shape from the connection portion along the center axis.

The pair of hubs each include a hub main body portion configured to engage with a rotation shaft, and a plurality of protrusion portions extending from the hub main body portion along the center axis between the rotation transmission portions, and configured to come into contact with an outer circumferential portion of each of the rotation transmission portions.

As described above, according to the present invention, each of the rotation transmission portions is connected to the connection portion in the circumferential direction, and each of the protrusion portions fits between the rotation transmission portions. Further, an outer circumferential portion of each of the rotation transmission portions in a substantially bar shape comes into contact with each of the protrusion portions.

Thus, when a rotation force is transmitted from one rotation shaft to one hub, this rotation force transmits from the hub main body portion and the protrusion portions of the one hub to the protrusion portions and the hub main body portion of the other hub via the rotation transmission portions, and transmits to the other rotation shaft connected to the other hub.

Therefore, the rotation force does not transmit to the connection portion. Hence, it is sufficient that the connection portion may have a requisite minimum thickness (the thickness of the connection portion in a direction along the center axis) that can keep the shape of the elastic member when connected to each of the rotation transmission portions.

Each of the rotation transmission portions is disposed along the circumferential direction. Therefore, when each of the rotation transmission portions and each of the protrusion portions fit to each other and the elastic body is interposed between the pair of hubs, the entire length of each of the rotation transmission portions and each of the protrusion portions in the direction along the center axis is an entire length of the elastic shaft coupling in the direction along the center axis. That is, an influence of the thickness of the connection portion on the entire length of the elastic shaft coupling is minimized.

As a result, compared to the technique disclosed in each of the above publications, the present invention can shorten the entire length of the elastic shaft coupling. Each of the rotation transmission portions is disposed in the circumferential direction and each of the rotation transmission portions that transmit the rotation force secures the length in the direction along the center axis. Consequently, it is possible to secure the same pressure reception area as that of conventional techniques and exhibit the substantially same rotation force transmission capability as that of the elastic shaft coupling disclosed in each of the above publications.

The pair of hubs each employ a simple structure that the plurality of protrusion portions extend from the hub main body portion along the center axis. Consequently, it is possible to manufacture each of the hubs by extrusion molding or pultrusion molding, and reduce manufacturing cost of each of the hubs.

Preferably, each of the rotation transmission portions is an elastic member in a substantially columnar shape, and a contact portion of each of the protrusion portions which comes into contact with each of the rotation transmission portions is formed in an arc shape in order to minimize an influence of a thickness of the connection portion on an entire length of the elastic shaft coupling. Consequently, it is possible to secure a contact area between each of the rotation transmission portions and each of the protrusion portions, and easily and reliably transmit the rotation force of the one rotation shaft to the other rotation shaft. As a result, it is possible to make the thickness of the connection portion thinner, and further reduce the influence of the thickness of the connection portion on the entire length of the elastic shaft coupling. The contact portion is formed in the arc shape, so that it is possible to efficiently disperse a stress produced inside the elastic shaft coupling. In this regard, the "substantially columnar shape" is a concept including various columnar shapes such as a perfect circular columnar shape or an elliptic columnar shape.

Part of each of the hub main body portions is formed in an arc shape and is in contact with the outer circumferential portion of each of the rotation transmission portions. Consequently, it is possible to efficiently transmit the rotation force of the one rotation shaft to the other rotation shaft, and easily disperse the stress produced inside the elastic shaft coupling.

As described above, according to the present invention, the connection portion can be set to the requisite minimum thickness and each of the rotation transmission portions can secure the length in the direction along the center axis. Consequently, the connection portion may be a member in a ring shape thinner than each of the rotation transmission portions and is configured to connect each of the rotation transmission portions in order to minimize an influence of a thickness of the connection portion on an entire length of the elastic shaft coupling. Consequently, it is possible to further reduce the influence of the thickness of the connection portion on the entire length of the elastic shaft coupling.

The protrusion portions of one of the hubs, the rotation transmission portions, the protrusion portions of another of the hubs and the rotation transmission portions are alternately disposed in order along the circumferential direction. Consequently, it is possible to smoothly transmit the rotation force of the rotation shaft connected to the one hub to the rotation shaft connected to the other hub via the protrusion portions of one of the hubs, the rotation transmission portions and the protrusion portions of another of the hubs.

In this regard, the elastic body is made of rubber such as NBR (nitrile rubber) or resin such as urethane, so that the elastic body can easily allow the influence of an eccentricity or a deflection angle of the rotation shaft.

A through-hole portion or a bottomed-hole portion is formed in the hub main body portion, a distal end portion of the rotation shaft is inserted in the through-hole portion or the bottomed-hole portion and the distal end portion of the rotation shaft is fixed to the hub main body portion by a fastening member. Consequently, rotation of the one rotation shaft easily transmits to the other rotation shaft via the elastic shaft coupling.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of an elastic shaft coupling according to the present invention will be described in detail below with reference to the drawings.

Configuration of Present Embodiment

An elastic shaft coupling 10 according to the present embodiment is a connection part that connects a first rotation shaft 12 and a second rotation shaft 14, and transmits a rotation force of one rotation shaft to the other rotation shaft as shown in FIGS. 1 to 4B. For example, the elastic shaft coupling 10 is used as one part of a rotation transmission mechanism such as an electric actuator that is not shown. In this case, the one rotation shaft is a motor drive shaft, and the other rotation shaft is a driven side rotation shaft.

The elastic shaft coupling 10 includes a metal first hub 16 that is connected to the first rotation shaft 12, a metal second hub 18 that is formed in the substantially same shape as that of the first hub 16, and is connected to the second rotation shaft 14, and an elastic body 20 that is interposed between the first hub 16 and the second hub 18.

Figure 1:
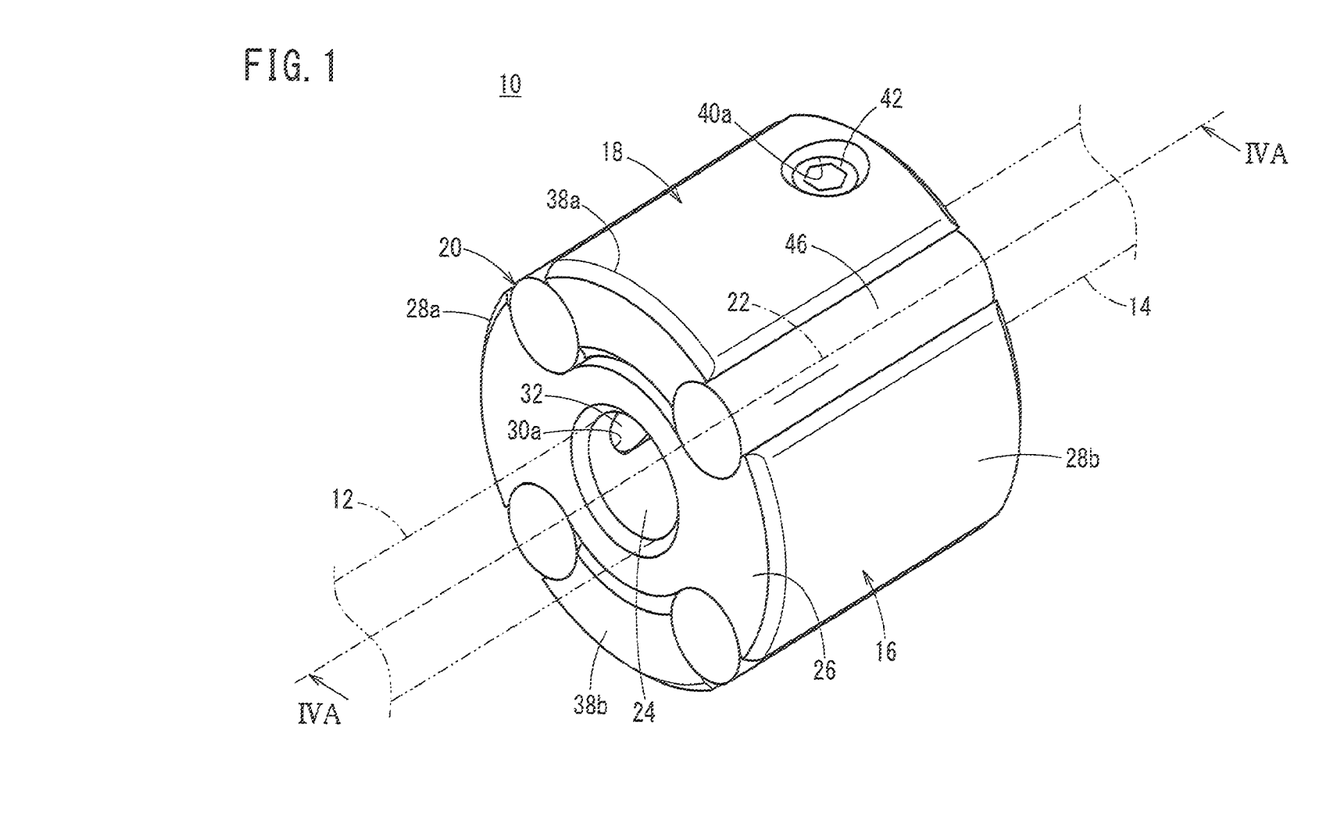
FIG. 1 is a perspective view of an elastic shaft coupling according to the present embodiment.
Figure 2:
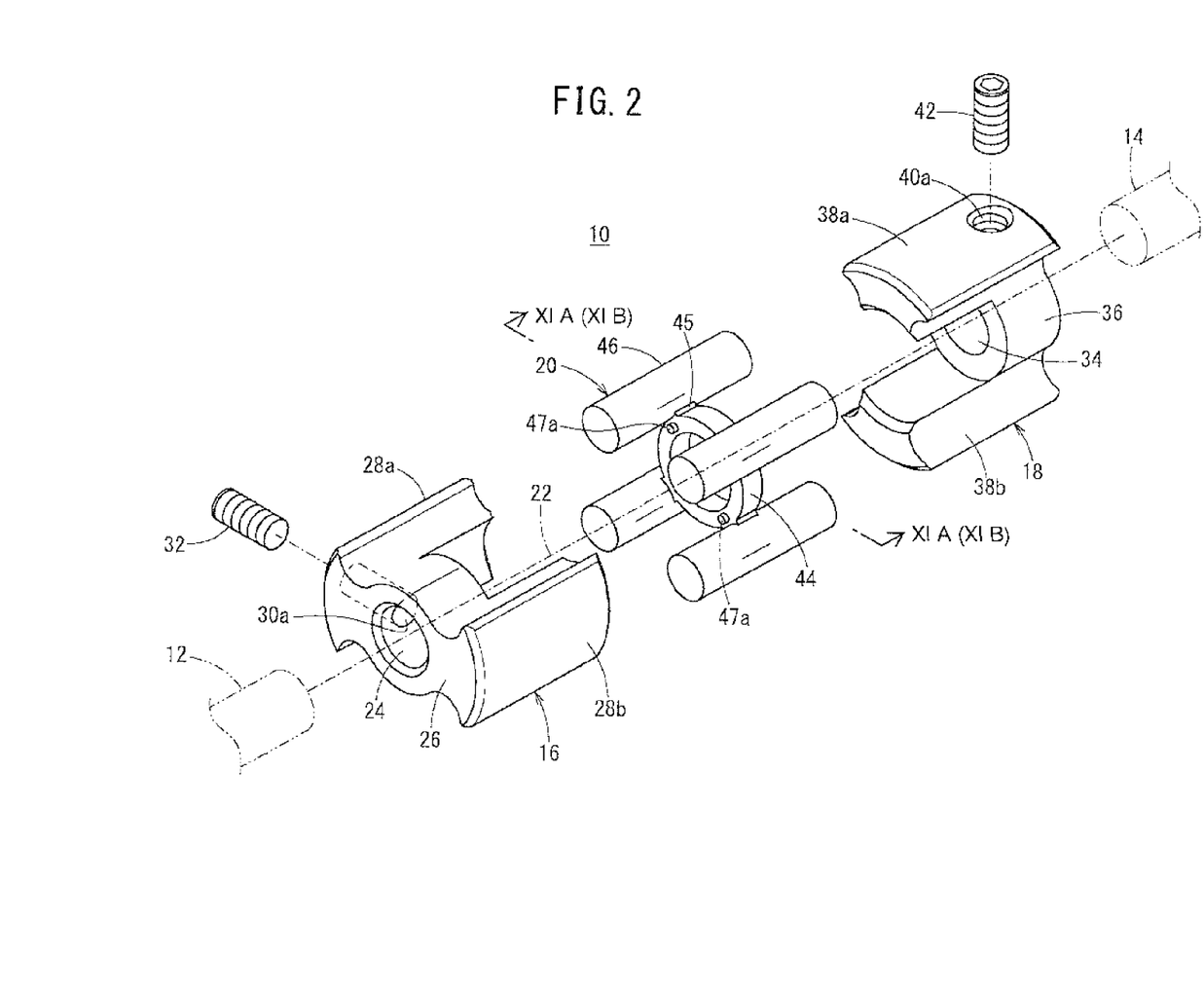
FIG. 2 is an exploded perspective view of the elastic shaft coupling in FIG. 1.

The first hub 16 includes a first hub main body portion 26 and two first protrusion portions 28a, 28b. The first hub main body portion 26 includes a first through-hole portion 24 formed substantially coaxially with a center axis 22, and into which a distal end portion of the first rotation shaft 12 is inserted. The first protrusion portions 28a, 28b extend from the first hub main body portion 26 to the second hub 18 along the center axis 22.

The first hub main body portion 26 is a metal member of a substantially I-shape, and includes the two first protrusion portions 28a, 28b that are formed protruding from both end portions of the first hub main body portion 26. A first screw through-hole 30a that penetrates the first hub main body portion 26 and reaches the first through-hole portion 24 is formed at a base end portion of the first protrusion portion 28a. A first screw member 32 as a fastening means screws into the first screw through-hole 30a. A distal end portion of the first screw member 32 reaches the first through-hole portion 24 and comes into contact with an outer circumference of a distal end portion of the first rotation shaft 12 inserted into the first through-hole portion 24 to fix the first rotation shaft 12 to the first hub main body portion 26.

The second hub 18 has the substantially same shape as that of the first hub 16, and is disposed in a state where the first hub 16 is rotated 90° about the center axis 22 in the circumferential direction of the elastic shaft coupling 10 and is longitudinally reversed with respect to the center axis 22.

That is, the second hub 18 includes a second hub main body portion 36 and two second protrusion portions 38a, 38b. The second hub main body portion 36 includes a second through-hole portion 34 formed substantially coaxially with the center axis 22 and into which a distal end portion of the second rotation shaft 14 is inserted. The second protrusion portions 38a, 38b extend from the second hub main body portion 36 to the first hub 16 along the center axis 22.

The second hub main body portion 36 is a metal member of a substantially I-shape and includes the two second protrusion portions 38a, 38b that are formed protruding from both end portions of the second hub main body portion 36. A second screw through-hole 40a that penetrates the second hub main body portion 36 and reaches the second through-hole portion 34 is formed at a base end portion of the second protrusion portion 38a. A second screw member 42 as a fastening means screws into the second screw through-hole 40a. A distal end portion of the second screw member 42 reaches the second through-hole portion 34 and comes into contact with an outer circumference of the distal end portion of the second rotation shaft 14 inserted into the second through-hole portion 34 to fix the second rotation shaft 14 to the second hub main body portion 36.

Figure 9A:
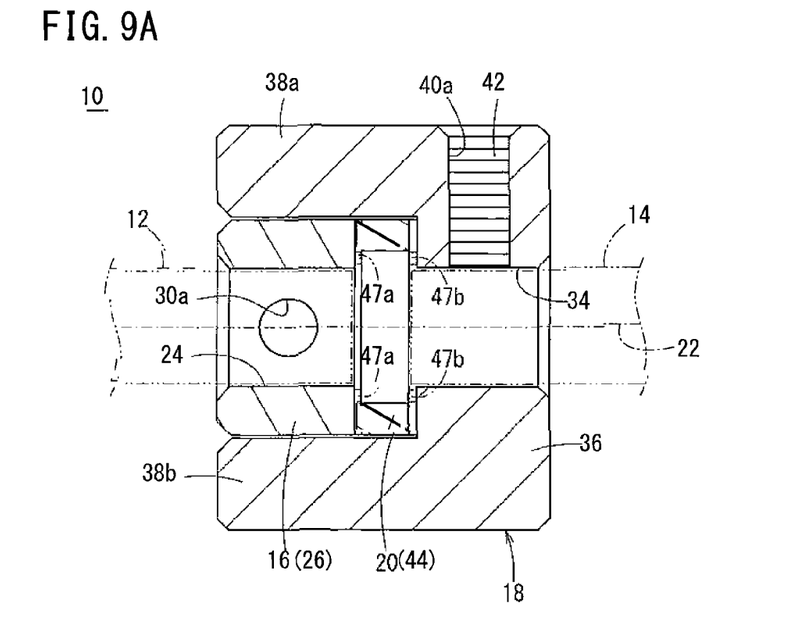
FIG. 9A is based on FIG. 4A but illustrates a variant with the elastic body being made of resin.
Figure 11A:
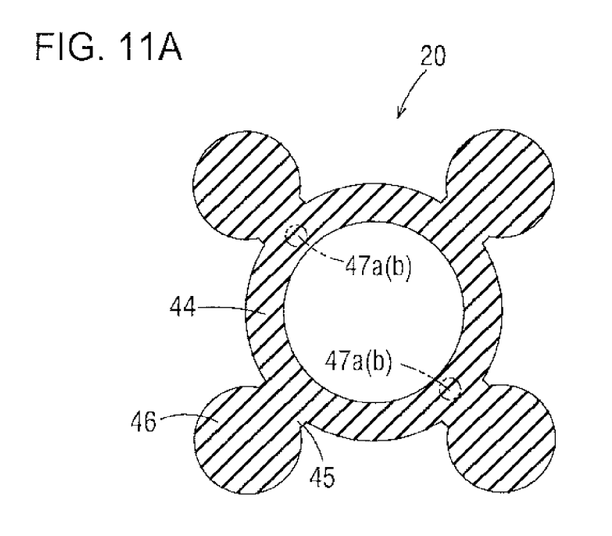
FIG. 11A is a cross-section view of an elastic body along the XIA-XIA line of FIG. 2.
Figure 11B:
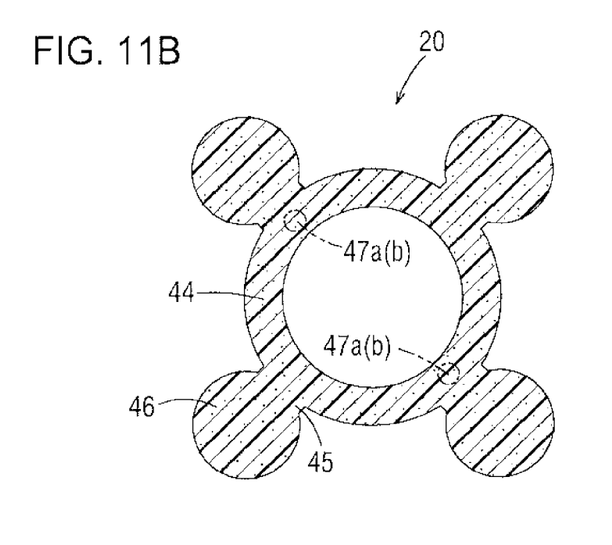
FIG. 11B is a cross-sectional view of the elastic body along the XIB-XIB line of FIG. 2.

The elastic body 20 is made of rubber such as NBR (see FIG. 4A, FIG. 9B and FIG. 11A) or resin such as urethane (see FIG. 9A and FIG. 11B), and includes a connection portion 44 of a ring shape that is disposed around the center axis 22, and four rotation transmission portions 46 that are arranged at predetermined angle intervals (approximately 90° interval) in the circumferential direction with respect to the connection portion 44. Each rotation transmission portion 46 is connected to an outer circumference of the connection portion 44 with a coupling portion 45 interposed therebetween.

Figure 4A:
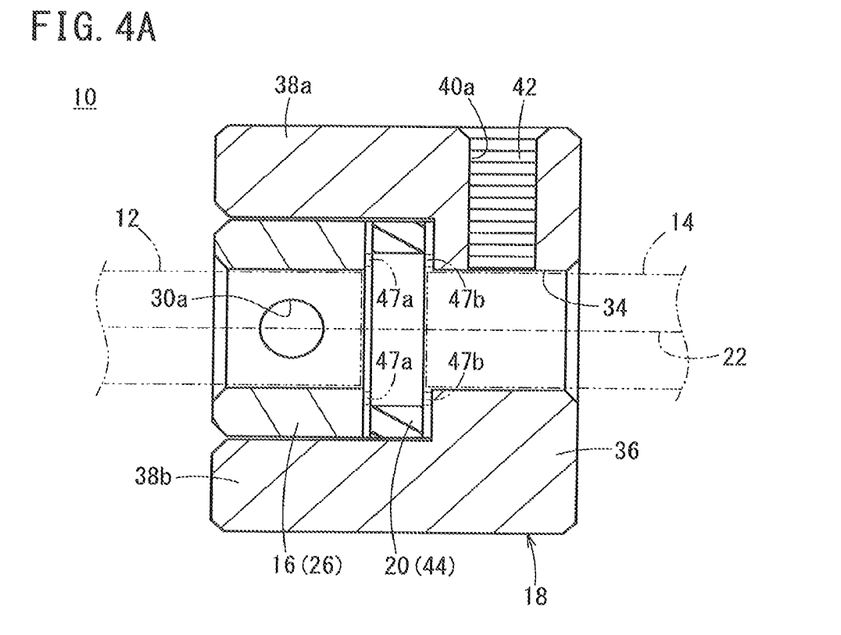
FIG. 4A is a cross-sectional view taken along an IVA-IVA line in FIG. 1.
Figure 4B:
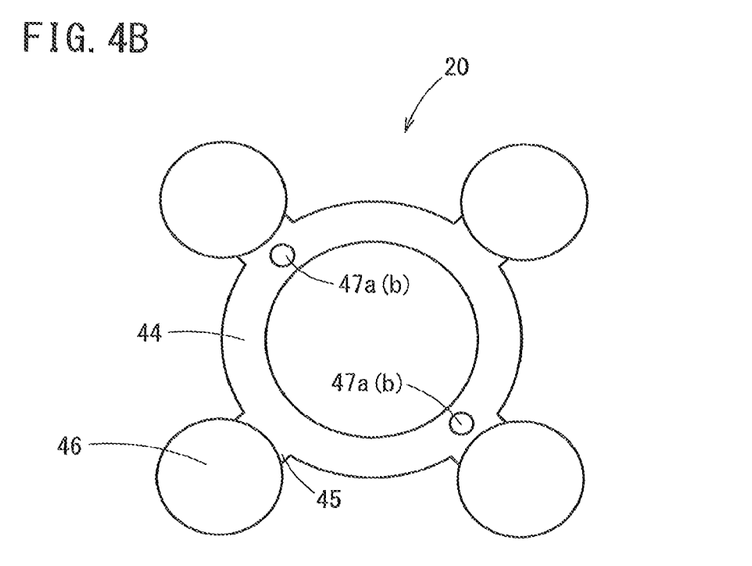
FIG. 4B is a front view of an elastic body.

The connection portion 44 is an elastic member that has small thickness or is short in a direction along the center axis 22. The thickness of the connection portion 44 may be such a thickness that can keep the shape of the elastic body 20. On surfaces of the connection portion 44, two projections 47a that project toward the first hub main body portion 26, and two projections 47b that project toward the second hub main body portion 36 are formed. In this case, the two projections 47a are arranged at 180° intervals on one surface of the connection portion 44 on a side that faces toward the first hub main body portion 26. The two projections 47b are arranged at 180° intervals on the other surface of the connection portion 44 on a side that faces toward the second hub main body portion 36.

The four rotation transmission portions 46 are elastic members of a substantially columnar shape that are connected to the outer circumference of the connection portion 44 and extend from the connection portion 44 toward the first hub 16 and the second hub 18 along the center axis 22. In this regard, the "substantially columnar shape" is a concept including various columnar shapes such as a perfect circular columnar shape or an elliptic columnar shape.

In the elastic shaft coupling 10 according to the present embodiment, in a state where the first hub 16 and the second hub 18 face each other with the elastic body 20 interposed therebetween and the second hub 18 is rotated 90° with respect to the first hub 16 in the circumferential direction, the elastic shaft coupling 10 is formed by assembling the first hub 16 and the second hub 18 such that the respective rotation transmission portions 46 fit between the first protrusion portions 28a, 28b and the second protrusion portions 38a, 38b.

In the present embodiment, a contact portion of the first hub main body portion 26 that comes into contact with the rotation transmission portions 46 and the second protrusion portions 38a, 38b is formed in an arc shape. Further, contact portions of the first protrusion portions 28a, 28b that come into contact with the rotation transmission portions 46 and the second hub main body portion 36 are formed in an arc shape. Furthermore, the first protrusion portions 28a, 28b are formed in substantially an arc shape when seen from a front view of FIG. 3A.

A contact portion of the second hub main body portion 36 that comes into contact with the rotation transmission portions 46 and the first protrusion portions 28a, 28b is formed in an arc shape. Further, contact portions of the second protrusion portions 38a, 38b that come into contact with the rotation transmission portions 46 and the first hub main body portion 26 are formed in arc shapes. Furthermore, the second protrusion portions 38a, 38b are formed in substantially arc shapes when seen from a back view of FIG. 3B.

The two projections 47a are formed on one surface of the connection portion 44 of the ring shape in the elastic shaft coupling 10. Consequently, contact of each projection 47a with the first hub main body portion 26 avoids surface contact between the one surface of the connection portion 44 and the first hub main body portion 26. Further, the two projections 47b are formed on the other surface of the connection portion 44. Therefore, contact of each projections 47b with the second hub main body portion 36 avoids surface contact between the other surface of the connection portion 44 and the second hub main body portion 36. The elastic shaft coupling 10 is formed in a columnar shape as an external appearance.

As a result, the entire length of the elastic shaft coupling 10 in the direction along the center axis 22 is set to the lengths of the first protrusion portions 28a, 28b, the second protrusion portions 38a, 38b and the rotation transmission portions 46 in the direction along the center axis 22.

Manufacturing Method and Operation According to Present Embodiment

The elastic shaft coupling 10 according to the present embodiment is configured as described above. Next, the manufacturing method of the elastic shaft coupling 10 and the operation of the elastic shaft coupling 10 will be described with reference to FIGS. 1 to 4B.

First, the first hub 16 and the second hub 18 are manufactured by extrusion molding or pultrusion molding. Next, the first screw through-hole 30a is formed in the first hub 16, and the second screw through-hole 40a is formed in the second hub 18. The elastic body 20 is also manufactured by a known elastic body manufacturing method.

By assembling the first hub 16, the second hub 18 and the elastic body 20 manufactured in this way, the elastic shaft coupling 10 is formed.

First, the first hub 16 and the second hub 18 are made face each other with the elastic body 20 interposed therebetween. In this case, the first hub 16 and the second hub 18 are made face each other in a state where the second hub 18 is rotated approximately 90° in the circumferential direction with respect to the first hub 16.

Next, the first hub 16 is moved toward the elastic body 20 to fit the one first protrusion portion 28a between the two left rotation transmission portions 46 in FIGS. 1 and 2, and fit the other first protrusion portion 28b between the two right rotation transmission portions 46 in FIGS. 1 and 2. Thus, the outer circumferential portion of each rotation transmission portion 46 comes into surface contact with the arc portions of the first protrusion portions 28a, 28b, and the two projections 47a form a certain gap between the first hub main body portion 26 and the connection portion 44. Consequently, it is possible to adequately absorb an influence of displacement and a deflection angle in the direction of the center axis 22.

Next, the second hub 18 is moved toward the elastic body 20 to fit the one second protrusion portion 38a between the two upper rotation transmission portions 46 in FIGS. 1 and 2, and fit the other second protrusion portion 38b between the two lower rotation transmission portions 46 in FIGS. 1 and 2. Thus, the outer circumferential portion of each rotation transmission portion 46 comes into surface contact with the arc portions of the second protrusion portions 38a, 38b, and the two projections 47b form a certain gap between the second hub main body portion 36 and the connection portion 44. Consequently, it is possible to adequately absorb the influence of the displacement and the eccentric angle in the direction of the center axis 22.

Figure 3A:
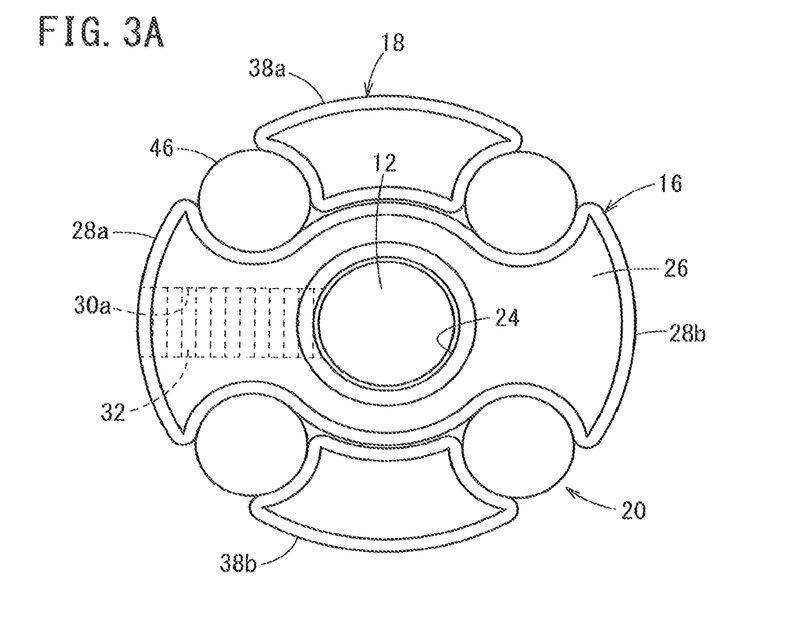
FIG. 3A is a front view of the elastic shaft coupling in FIG. 1.
Figure 3B:
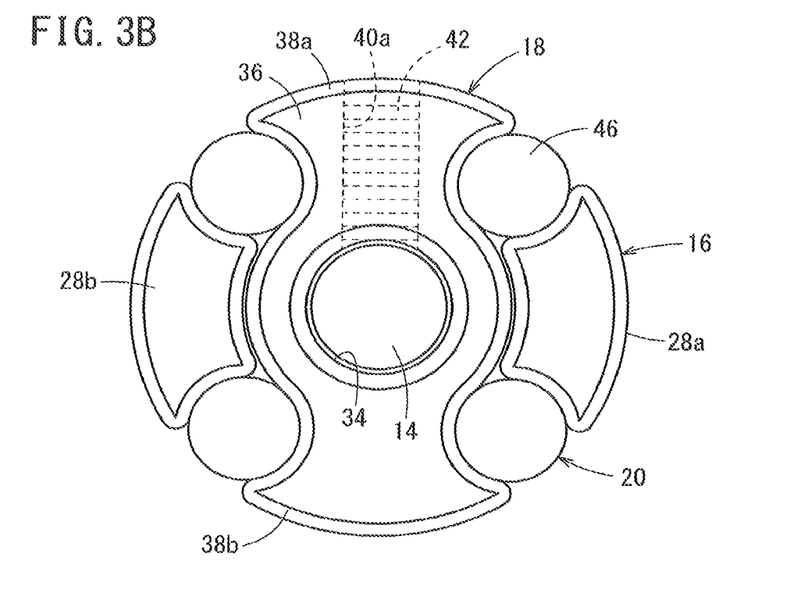
FIG. 3B is a back view of the elastic shaft coupling in FIG. 1.

As a result, as shown in FIGS. 3A and 3B, the first protrusion portion 28a, the rotation transmission portion 46, the second protrusion portion 38a, the rotation transmission portion 46, the first protrusion portion 28b, the rotation transmission portion 46, the second protrusion portion 38b and the rotation transmission portion 46 are disposed in order along the circumferential direction in the elastic shaft coupling 10.

Next, the distal end portion of the first rotation shaft 12 is inserted in the first through-hole portion 24 of the first hub main body portion 26. Subsequently, the first screw member 32 is screwed into the first screw through-hole 30a. As a result, a distal end portion of the first screw member 32 reaching the first through-hole portion 24 comes into contact with the distal end portion of the first rotation shaft 12, and the first rotation shaft 12 is fixed to the first hub main body portion 26.

The distal end portion of the second rotation shaft 14 is inserted in the second through-hole portion 34 of the second hub main body portion 36, too, and then the second screw member 42 is screwed into the second screw through-hole 40a. As a result, a distal end portion of the second screw member 42 reaching the second through-hole portion 34 comes into contact with the distal end portion of the second rotation shaft 14, and the second rotation shaft 14 is fixed to the second hub main body portion 36.

According to the elastic shaft coupling 10 formed as described above, when, for example, the rotation force of the first rotation shaft 12 is transmitted to the second rotation shaft 14 via the elastic shaft coupling 10, this rotation force transmits from the first rotation shaft 12 to the second rotation shaft 14 via the first hub main body portion 26, the first protrusion portions 28a, 28b, the rotation transmission portions 46, the second protrusion portions 38a, 38b and the second hub main body portion 36. Consequently, it is possible to smoothly transmit the rotation force of the first rotation shaft 12 to the second rotation shaft 14.

Modifications of Present Embodiment

Next, Modifications (Examples 1 to 4) of the elastic shaft coupling 10 according to the present embodiment will be described with reference to FIGS. 5A to 8B. Examples 1 to 4 schematically describe a method for fastening the first rotation shaft 12 or the second rotation shaft 14 to the first hub 16 or the second hub 18.

Figure 5A:
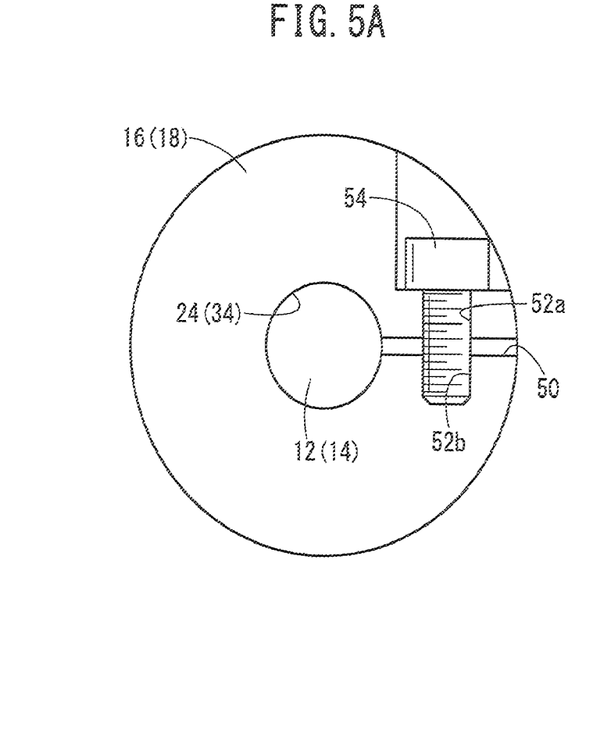
FIGS. 5A and 5B are schematic explanatory views of Example 1.
Figure 5B:
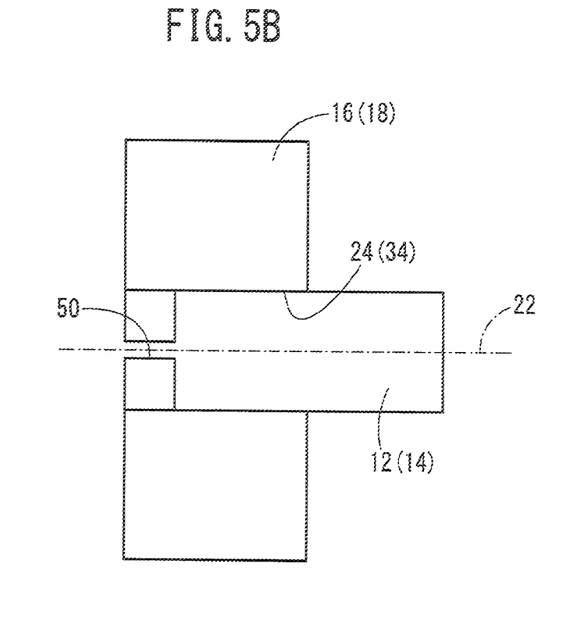

In Example 1 shown in FIGS. 5A and 5B, a slit 50 is formed between an outer circumferential portion of the first hub 16 and the first through-hole portion 24, or the second hub 18 and the second through-hole portion 34. Bolt insertion through-holes 52a, 52b are formed crossing the slit 50 in the first hub 16 or the second hub 18.

In a state where the distal end portion of the first rotation shaft 12 or the second rotation shaft 14 is inserted in the first through-hole portion 24 or the second through-hole portion 34, a clamping bolt 54 as a fastening means is screwed into the bolt insertion through-holes 52a, 52b to fasten the first hub 16 or the second hub 18. The diameter of the first through-hole portion 24 or the second through-hole portion 34 is reduced, and the first rotation shaft 12 or the second rotation shaft 14 is clamped with respect to the first hub 16 or the second hub 18.

Figure 6A:
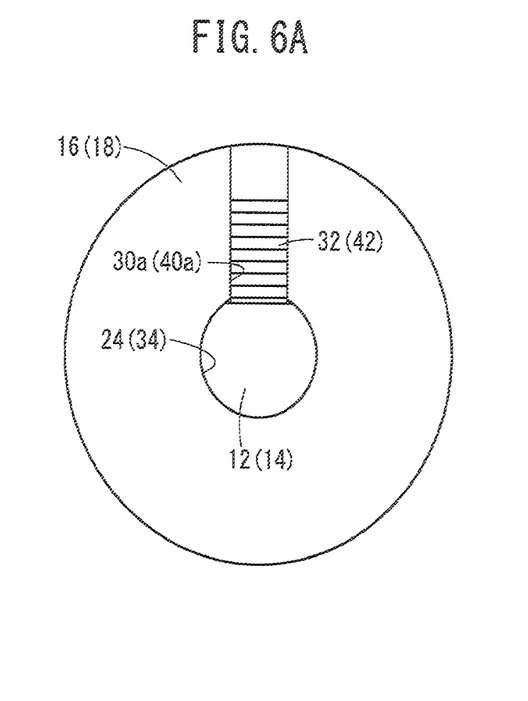
FIGS. 6A and 6B are schematic explanatory views of Example 2.
Figure 6B:
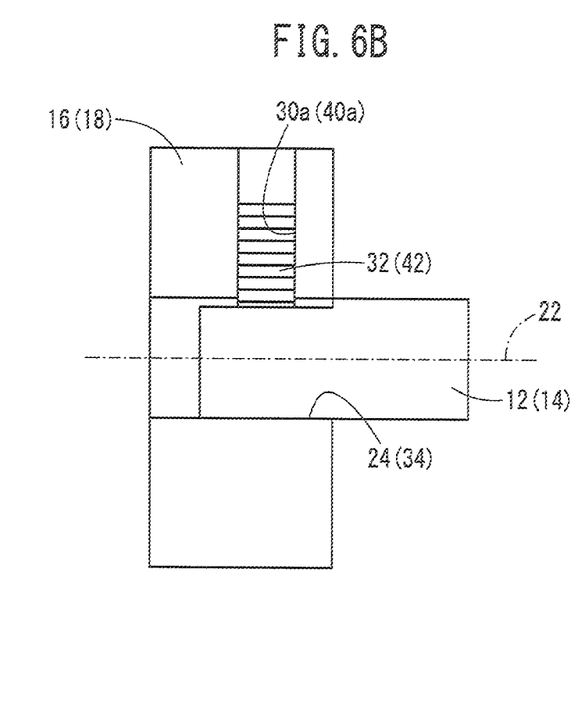

Example 2 shown in FIGS. 6A and 6B describes that the first screw member 32 or the second screw member 42 is a locking screw, and part of the distal end portion of the first rotation shaft 12 or the second rotation shaft 14 is formed in a planar shape. In this case, the distal end portion of the first rotation shaft 12 or the second rotation shaft 14 is inserted in the first through-hole portion 24 or the second through-hole portion 34 to make the planar portion face the first screw through-hole 30a or the second screw through-hole 40a. Next, the first screw member 32 or the second screw member 42 is screwed into the first screw through-hole 30a or the second screw through-hole 40a. Thus, when the distal end portion of the first screw member 32 or the second screw member 42 reaches the first through-hole portion 24 or the second through-hole portion 34, and comes into contact with the planar portion of the first rotation shaft 12 or the second rotation shaft 14, the first rotation shaft 12 or the second rotation shaft 14 is easily fixed to the first hub 16 or the second hub 18.

Figure 7A:
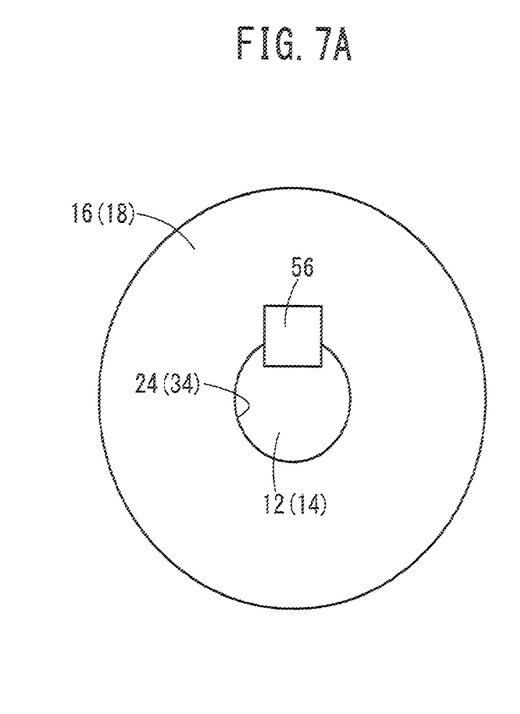
FIGS. 7A and 7B are schematic explanatory views of Example 3.
Figure 7B:
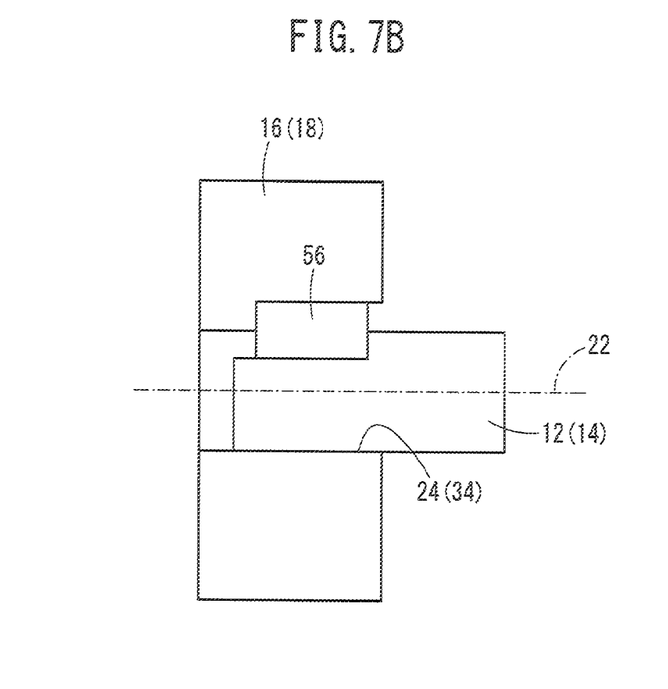

In Example 3 shown in FIGS. 7A and 7B, a key 56 as a fastening means is arranged at the distal end portion of the first rotation shaft 12 or the second rotation shaft 14, and this distal end portion and the key 56 are inserted into the first through-hole portion 24 or the second through-hole portion 34 to fix the first rotation shaft 12 or the second rotation shaft 14 to the first hub 16 or the second hub 18.

Figure 8A:
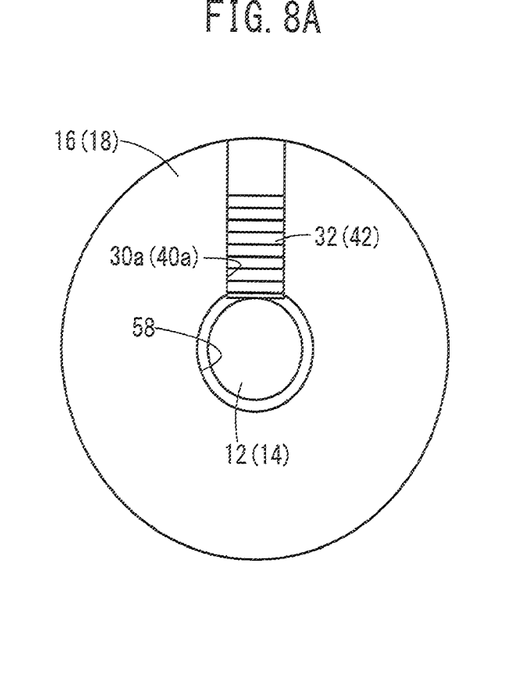
FIGS. 8A and 8B are schematic explanatory views of Example 4.
Figure 8B:
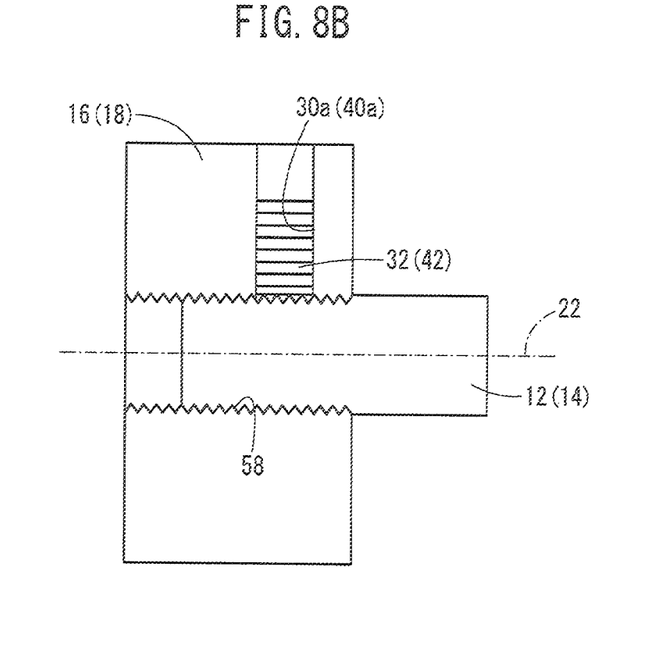

Example 4 shown in FIGS. 8A and 8B describes that the first screw member 32 or the second screw member 42 is a locking screw, and the distal end portion of the first rotation shaft 12 or the second rotation shaft 14 is threaded. In Example 4, a screw through-hole 58 along the center axis 22 is formed in the first hub 16 or the second hub 18 instead of the above-described first through-hole portion 24 or the second through-hole portion 34.

In this case, the distal end portion (screw portion) of the first rotation shaft 12 or the second rotation shaft 14 is screwed into the screw through-hole 58. Thus, the first rotation shaft 12 or the second rotation shaft 14 is fixed to the first hub 16 or the second hub 18. Next, the first screw member 32 or the second screw member 42 is screwed into the first screw through-hole 30a or the second screw through-hole 40a. Thus, when the distal end portion of the first screw member 32 or the second screw member 42 reaches the screw through-hole 58, the distal end portion comes into contact with an outer circumference of the screw portion of the first rotation shaft 12 or the second rotation shaft 14. In this case, the distal end portion of the first screw member 32 or the second screw member 42 functions to lock reverse rotation of the first rotation shaft 12 or the second rotation shaft 14, and can reliably fix the first rotation shaft 12 or the second rotation shaft 14 to the first hub 16 or the second hub 18.

Thus, each of the fastening methods according to Examples 1 to 4 can easily fix the first rotation shaft 12 or the second rotation shaft 14 to the first hub 16 or the second hub 18.

In this regard, above Examples 1 to 4 are shown by way of illustration, and any fastening means that can fix the first rotation shaft 12 or the second rotation shaft 14 to the first hub 16 or the second hub 18 can be also employed.

Figure 9B:
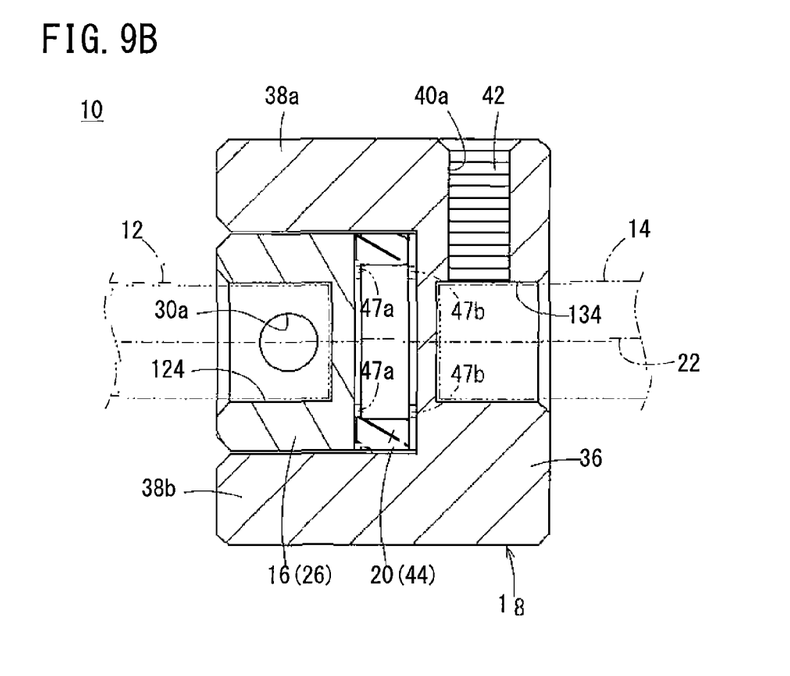
FIG. 9B is based on FIG. 4A but illustrates a variant having bottomed hole portions.
Figure 10:
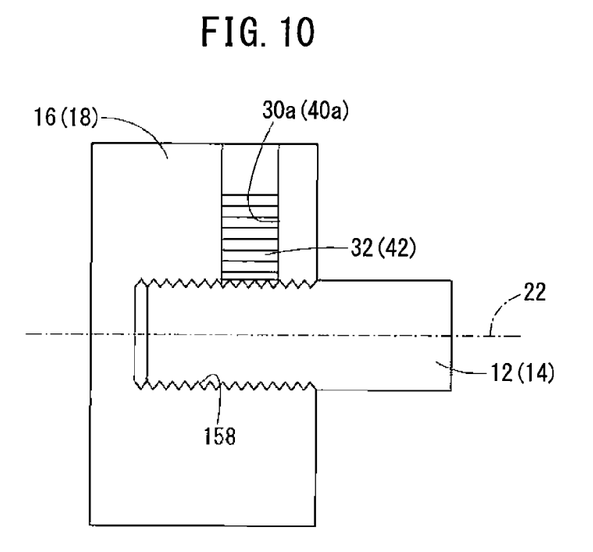
FIG. 10 is based on FIG. 8B but illustrates a variant having bottomed hole portions.

In Example 2 and Example 4 (see FIGS. 6A, 6B, 8A and 8B), for example, the first rotation shaft 12 or the second rotation shaft 14 may be fixed by using an adhesive instead of being fixed by using the first screw member 32 or the second screw member 42. Alternatively, a bolt that is not shown may be screwed into the first screw through-hole 30a or the second screw through-hole 40a, and a fastening torque may be applied to the first hub 16 or the second hub 18 and the first rotation shaft 12 or the second rotation shaft 14, to fix the first rotation shaft 12 or the second rotation shaft 14. Further, the first through-hole portion 24, the second through-hole portion 34 or the screw through-hole 58 into which the first rotation shaft 12 or the second rotation shaft 14 is inserted may be also replaced with an bottomed-hole portion 124, 134, 158 (screw bottomed-hole portion 158 in FIG. 10) of a predetermined depth as shown in FIG. 9B and FIG. 10.

Effect of Present Embodiment

As described above, in the elastic shaft coupling 10 according to the present embodiment, each rotation transmission portion 46 is connected to the connection portion 44 in the circumferential direction, and the first protrusion portions 28a, 28b and the second protrusion portions 38a, 38b fit between the rotation transmission portions 46. The outer circumferential portion of each rotation transmission portion 46 of a substantially bar shape (columnar shape) comes into surface contact with the first hub main body portion 26, the second hub main body portion 36, the first protrusion portions 28a, 28b and the second protrusion portions 38a, 38b.

Thus, when the rotation force transmits from one rotation shaft to one hub, this rotation force transmits from the hub main body portion and the protrusion portions of one hub to the protrusion portions and the hub main body portion of the other hub via the rotation transmission portions 46, and transmits to the other rotation shaft connected to the other hub.

Hence, the rotation force does not transmit to the connection portion 44. Therefore, it is sufficient that the connection portion 44 may have a requisite minimum thickness (the length of the connection portion 44 in the direction along the center axis 22) such that the connection portion 44 can keep the shape of the elastic body 20 when connected to each rotation transmission portion 46.

Each rotation transmission portion 46 is disposed along the circumferential direction. When each rotation transmission portion 46 fits between the first protrusion portions 28a, 28b and the second protrusion portions 38a, 38b, and the elastic body 20 is interposed between the first hub 16 and the second hub 18, the entire length of the elastic shaft coupling 10 in the direction along the center axis 22 is defined by the entire length of each rotation transmission portion 46, the first protrusion portions 28a, 28b and the second protrusion portions 38a, 38b in the direction along the center axis 22. That is, the influence of the thickness of the connection portion 44 on the entire length of the elastic shaft coupling 10 is minimized.

As a result, compared to the conventional technique disclosed in each of the above publications, the elastic shaft coupling 10 according to the present embodiment can shorten the entire length of the elastic shaft coupling 10. Since each rotation transmission portion 46 is disposed in the circumferential direction, each rotation transmission portion 46 that transmits the rotation force secures the length in the direction along the center axis 22. Consequently, it is possible to secure the same pressure reception area as that of the conventional technique, and exhibit the same rotation force transmission capability as the elastic shaft coupling disclosed in each of the above publications.

Further, the first hub 16 and the second hub 18 employ a simple structure in which a plurality of the first protrusion portions 28a, 28b and the second protrusion portions 38a, 38b extend from the first hub main body portion 26 and the second hub main body portion 36 along the center axis 22. Consequently, it is possible to manufacture the first hub 16 and the second hub 18 by extrusion molding or pultrusion molding, and reduce manufacturing cost of the first hub 16 and the second hub 18.

Each rotation transmission portion 46 is an elastic member of a substantially columnar shape. The contact portions of the first protrusion portions 28a, 28b and the second protrusion portions 38a, 38b that come into contact with each rotation transmission portion 46 are formed in the arc shapes to minimize the influence of the thickness of the connection portion 44 on the entire length of the elastic shaft coupling 10. Consequently, it is possible to secure the contact areas of each rotation transmission portion 46, and the first protrusion portions 28a, 28b and the second protrusion portions 38a, 38b, and thereby easily and reliably transmit the rotation force of one rotation shaft to the other rotation shaft. As a result, it is possible to make the thickness of the connection portion 44 further thinner, and more reduce the influence of the thickness of the connection portion 44 on the entire length of the elastic shaft coupling 10. The contact portions are formed in the arc shapes, so that it is possible to efficiently disperse a stress produced inside the elastic shaft coupling 10.

Part of the first hub main body portion 26 and the second hub main body portion 36 are formed in an arc shape and are placed in contact with the outer circumferential portion of each rotation transmission portion 46. Consequently, it is possible to efficiently transmit the rotation force of one rotation shaft to the other rotation shaft, and easily disperse the stress produced inside the elastic shaft coupling 10.

According to the elastic shaft coupling 10, the connection portion 44 can be set to the requisite minimum thickness and each of the rotation transmission portions 46 can secure the length in the direction along the center axis 22. Consequently, the connection portion 44 can be formed as a thin member of a ring shape that connects each rotation transmission portion 46 to minimize the influence of the thickness of the connection portion 44 on the entire length of the elastic shaft coupling 10. Consequently, it is possible to further reduce the influence of the thickness of the connection portion 44 on the entire length of the elastic shaft coupling 10.

The protrusion portions of the one hub, the rotation transmission portions 46, the protrusion portions of the other hub and the rotation transmission portions 46 are alternately disposed along the circumferential direction. Consequently, it is possible to smoothly transmit the rotation force of the rotation shaft connected to the one hub to the rotation shaft connected to the other hub via the protrusion portions of the one hub, the rotation transmission portions 46 and the protrusion portions of the other hub.

The elastic body 20 is made of rubber such as NBR or resin such as urethane. Consequently, it is possible to easily allow the influence of the eccentricity or the deflection angle of the first rotation shaft 12 and the second rotation shaft 14 by the elastic body 20.

The distal end portion of the first rotation shaft 12 is inserted in the first through-hole portion 24 or the screw through-hole 58 formed in the first hub main body portion 26, and is fixed to the first hub main body portion 26 by the first screw member 32, the clamping bolt 54 or the key 56 as the fastening means. Meanwhile, the distal end portion of the second rotation shaft 14 is inserted in the second through-hole portion 34 or the screw through-hole 58 formed in the second hub main body portion 36, and is fixed to the second hub main body portion 36 by the second screw member 42, the clamping bolt 54 or the key 56 as the fastening means. Consequently, it is possible to easily transmit the rotation force of one rotation shaft to the other rotation shaft via the elastic shaft coupling 10.

The present invention is not limited to the above embodiment, and can naturally employ various configurations

What is claimed is:

1. An elastic shaft coupling comprising:
    a pair of metal hubs formed in a substantially same shape and assembled to each other in a state where phases are shifted at a predetermined angle in a circumferential direction; and
    an elastic body interposed between the pair of hubs, wherein the elastic body includes:
        a connection portion disposed around a center axis of the elastic shaft coupling; and
        a plurality of rotation transmission portions provided for the connection portion along the circumferential direction, and each extending in a substantially bar shape from the connection portion along the center axis, and
    the pair of hubs each include:
        a hub main body portion configured to engage with a rotation shaft; and
        a plurality of protrusion portions extending from the hub main body portion along the center axis between the rotation transmission portions, and configured to come into contact with an outer circumferential portion of each of the rotation transmission portions,
    wherein each of the rotation transmission portions is an elastic member in a substantially columnar shape, and
    a contact portion of each of the protrusion portions which comes into contact with each of the rotation transmission portions is formed in an arc shape in order to minimize an influence of a thickness of the connection portion on an entire length of the elastic shaft coupling,
    part of each of the hub main body portions is formed in an arc shape and is in contact with the outer circumferential portion of each of the rotation transmission portions.

2. The elastic shaft coupling according to claim 1, wherein the connection portion is a member in a ring shape and is thinner than each of the rotation transmission portions, wherein the connection portion is configured to connect each of the rotation transmission portions in order to minimize an influence of a thickness of the connection portion on an entire length of the elastic shaft coupling.

3. The elastic shaft coupling according to claim 1, wherein the protrusion portions of one of the hubs, the rotation transmission portions, the protrusion portions of another of the hubs, and the rotation transmission portions, are alternately disposed in order along the circumferential direction.

4. The elastic shaft coupling according to claim 1, wherein the elastic body is made of rubber or resin.

5. The elastic shaft coupling according to claim 1, wherein a through-hole portion or a bottomed-hole portion is formed in the hub main body portion,
    a distal end portion of the rotation shaft is inserted in the through-hole portion or the bottomed-hole portion, and
    the distal end portion of the rotation shaft is fixed to the hub main body portion by a fastening member.

* * * * *